United States Patent [19]

Shiratsuchi

[11] Patent Number: 5,018,090
[45] Date of Patent: May 21, 1991

[54] DIGITAL INTERPOLATION CIRCUITRY

[75] Inventor: Shinichi Shiratsuchi, Yokohama, Japan

[73] Assignee: RCA Licensing Corporation, Princeton, N.J.

[21] Appl. No.: 493,020

[22] Filed: Mar. 13, 1990

[51] Int. Cl.⁵ .............................................. G06F 15/31
[52] U.S. Cl. ................................ 364/723; 364/724.10
[58] Field of Search ............... 364/723, 724.01, 724.10

[56] References Cited

U.S. PATENT DOCUMENTS

| | | | |
|---|---|---|---|
| 4,263,671 | 4/1981 | Chin et al. | 375/15 |
| 4,302,631 | 11/1981 | Shenoi et al. | 179/15.55 |
| 4,313,173 | 1/1982 | Candy et al. | 364/723 |
| 4,344,149 | 8/1982 | van de Meeberg et al. | 364/724.10 |
| 4,400,719 | 8/1983 | Powers | 358/21 |
| 4,694,414 | 9/1987 | Christopher | 364/724 |

Primary Examiner—Dale M. Shaw
Assistant Examiner—Long T. Nguyen
Attorney, Agent, or Firm—Joseph S. Tripoli; Eric P. Herrmann; James B. Hayes

[57] ABSTRACT

A sampled data interpolator includes a linear interpolator coupled in parallel with a nonlinear compensation signal path. The nonlinearly processed signals and the linearly interpolated signals are summed to produce interpolated samples. The nonlinear compensation signal path includes a finite impulse response filter having tap weights conforming to a sinc function, and a weighting circuit for scaling filtered samples by a normalized sinc function.

6 Claims, 4 Drawing Sheets

DIGITAL INTERPOLATION CIRCUITRY

This invention relates to circuitry for generating signal values between known values as for example in expanding or compressing video images.

BACKGROUND OF THE INVENTION

In video signal expansion and compression systems it is desired to perform a time scaling of discrete-time signals. However, in order to realize a general scaling of the discrete-time axis for the transformation $y(m)=x(a\cdot m)$, a major problem arises; the input signal $x(a\cdot m)$ is undefined for non-integral values of its index $(a\cdot m)$. Interpolation is the solution to this problem. When the output requires a sample of the input at a time index with an undefined input value, an interpolated value must be supplied. A large body of literature exists on the topic of interpolation, but several points are worth noting: (a) interpolation which uses a large number of input samples weighted with a sin (x)/x function provides accurate results but is costly to implement for consumer apparatus; (b) sample-and-hold interpolation is the easiest to implement but has generally poor performance; (c) linear interpolation is relatively easy to implement and provides superior performance to the sample-and-hold technique, but exhibits increasing attenuation with increasing signal frequency; and (d) higher order interpolation provides superior performance to linear interpolation but exhibits nonlinearities.

T. J. Christopher in U.S. Pat. No. 4,694,414 described a relatively non-complex interpolator which exhibits relatively accurate performance and which is realized with a parallel combination of a two-point linear interpolator and a phase compensation filter. The compensation filter has a transfer function $H_{(z)}$ given by $$H_{(z)} = -1 + z^{-1} + z^{-2} - z^{-3}) \quad (1)$$

where z is the conventional "z" transform variable and the exponents thereof correspond to the number of sample intervals. It should be noted that the weighting coefficients are either plus or minus one. The amplitude characteristic of the filter $A(\phi)$ is given by $$A(\Phi) = 2\cos(\Phi/2) - 2\cos(3\Phi/2) \quad (2)$$

where $\Phi$ represents frequency in radians per second.

The compensation filter is cascaded with a gain element programmed with estimated gain values corresponding to the possible positions at which the system is designed to produce interpolated values. These gain values are derived by calculating the response error at a particular signal frequency. Since these gain values are not a function of frequency the response of the Christopher system contains residual errors.

It is an object of the present invention to provide a relatively simple interpolation circuit, which has a substantially accurate response characteristic for all signal frequencies up to the Nyquist sampling limit of the system.

SUMMARY OF THE INVENTION

The present invention is a signal interpolator including the parallel combination of a linear interpolator and a compensating filter. The compensating filter is a finite impulse response filter including tap weights, successive ones of which follow a modified sin (x)/x function.

DETAILED DESCRIPTION

Figure 1:
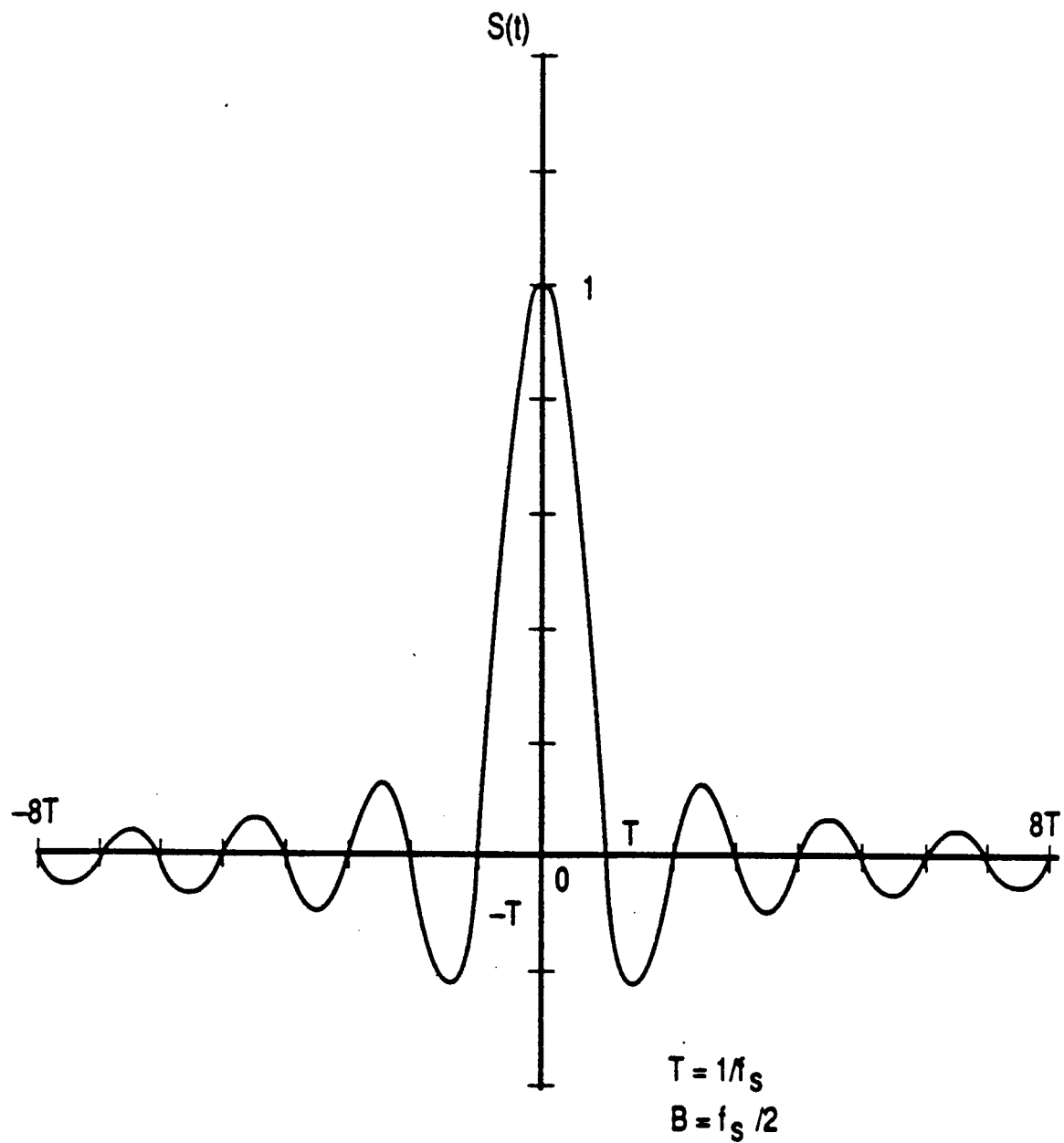
FIG. 1 is a waveform diagram illustrating a sinc sampling function.

It is well known that ideal interpolation can be achieved by convolving an input signal with a function S which expresses the impulse response of an ideal low pass filter. For continuous signals the function S is defined $$S(t) = \sin(2\pi\beta t)/2\pi\beta t \quad (3)$$

where $\beta$ is equal to the Nyquist frequency and the function of equation (3) is defined as the sinc function. The function S(t) is illustrated in FIG. 1. The discrete time interpolated value corresponding to a particular time may be calculated from a discrete time or sampled signal using the convolutions of S(t) and the sampled signal g(Tn). That is, an interpolated sample value g(to) for sample time to may be calculated from the sum of products $g(Tn) \times S_n(to)$ where $S_n(to)$ corresponds to a discrete time version of the function S and is given by $$S_n(t) = \sin(2\pi\beta(t-nT))/(2\pi\beta(t-nT)) \quad (4)$$

More particularly, the interpolated value g(to) is given by $$g(to) = \sum_{n=-\infty}^{\infty} \{g(Tn) \times S_n(to)\} \quad (5)$$

Note however that it is not practical to perform the computation for all of the assigned values.

In order to implement the function in realizable hardware the following constraints are used. (1) The number of interpolated values between two sample points is limited to N (e.g., N=64). (2) Only M samples preceding and M samples following the point for which an interpolated value is to be calculated are used in the calculation. In the embodiment shown M is equal to four, thus a total of eight samples are used for each calculation.

The sampling function Sn(t) is divided into a linear part and a nonlinear part. More particularly the terms $$S_0(t) = F_0(t) + (1 - t/T) \quad (6)$$

$$S_1(t) = F_1(t) + t/T \quad (7)$$

and $S_n(t) = F_n(t)$ for values of n except zero and one.
The functions $F_n(t)$ are further defined.

$$F_0(t) = F_1(t) = k_0 F(t) \quad (8)$$

$$F_{-1}(t) = F_2(t) = k_1 F(t) \quad (9)$$

$$F_{-2}(t) = F_3(t) = k_2 F(t) \quad (10)$$

$$F_{-3}(t) = F_4(t) = k_3 F(t) \quad (11)$$

and $$k_0 = S_0(T/2) - 0.5 \quad (12)$$

$$k_1 = S_1(T/2) - 0.5 \quad (13)$$

and the remaining $k_n$ are given by $$k_n = S_n(T/2) \quad (14)$$

Figure 2:
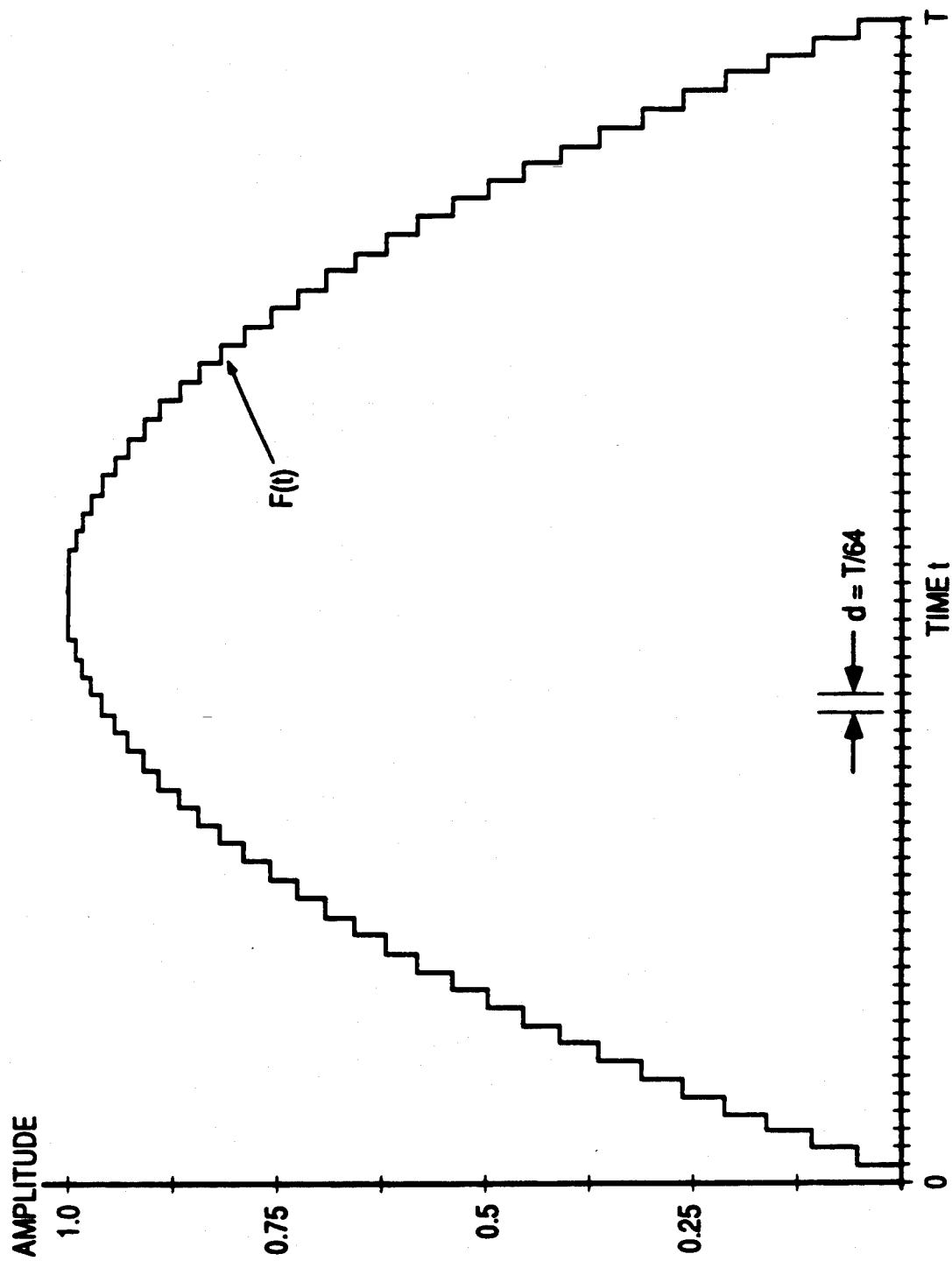
FIG. 2 is a graphical representation of a normalized sinc function which may be utilized in an embodiment of the invention.

The function F(t) is defined $$F(t) = \{S_{-1}(t) + S_2(t)\}/\{2S_2(T/2)\} \quad (15)$$

where the argument t in equation 15 corresponds to the position in time between the input sample points for which an interpolated value is calculated and the terms $S_{-1}$ and $S_2$ in equation 15 conform to the sinc function as defined in equation 4. For example, assume that the point for which an interpolated value is to be calculated is between successive samples Sa and Sb and is a distance (R/N)T from the first occurring sample Sa. The value (1−R/N)T is substituted for the argument t in equation 15 where R/N(T) defines the fractional portion of the sample period T. The values of F(t) for N equal to 64 are shown graphically in FIG. 2.

Substituting equations 6–14 into equation 5 results in $$g(to) = (1 - R/N)g(0) + R/N \, g(T) + \quad (16)$$

$$F(to) \cdot \{k_3 \cdot g(-3T) + k_2 \cdot g(-2T) + k_1 \cdot g(-T) +$$

$$k_0 \cdot g(0) + k_1 \cdot g(T) + k_2 \cdot g(-2T) + k_3 \cdot g(3T) +$$

$$k_4 \cdot g(4T)\}$$

The first two terms correspond to linear interpolation. The latter terms correspond to a finite impulse response filter function multiplied by the variable gain function F(t). The values $k_n$ represent weighting coefficients applied to respective samples g(nT). Table I illustrates the respective values of $k_n$ for an eight tap filter.

TABLE 1

| | | | | |
|---|---|---|---|---|
| $k_{-3}$ | = | $-2/(7\pi)$ | = | $-0.0909$ |
| $k_{-2}$ | = | $2/(5\pi)$ | = | $0.1273$ |
| $k_{-1}$ | = | $-2/(3\pi)$ | = | $-0.2122$ |
| $k_0$ | = | $2/\pi - 0.5$ | = | $0.1366$ |
| $k_1$ | = | $2/\pi - 0.5$ | = | $0.1366$ |
| $k_2$ | = | $-2/(3\pi)$ | = | $-0.2122$ |
| $k_3$ | = | $2/(5\pi)$ | = | $0.1273$ |
| $k_4$ | = | $-2/(7\pi)$ | = | $-0.0909$ |

Figure 3:
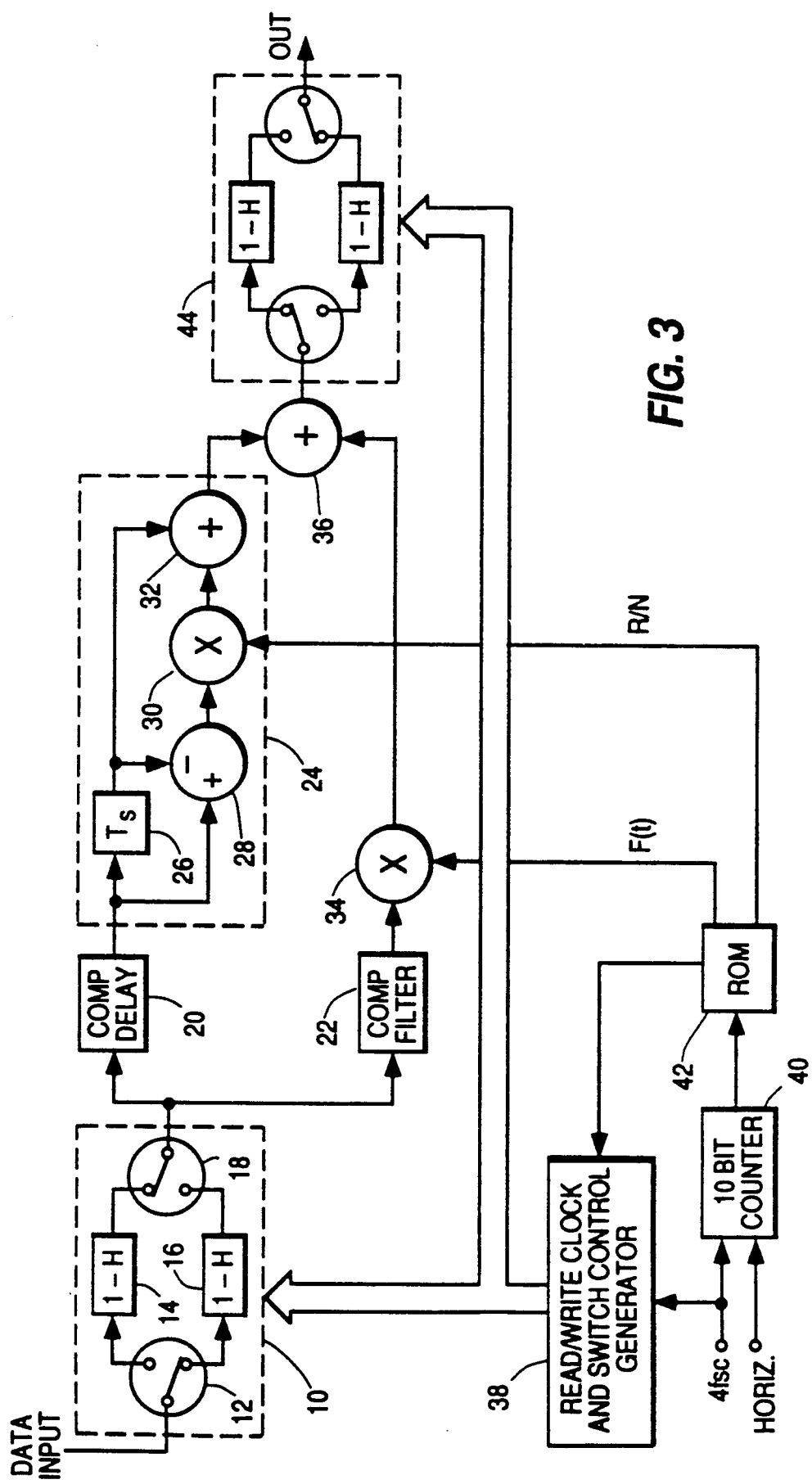
FIG. 3 is a block diagram of an interpolator system embodying the invention.

The interpolation system is shown in FIG. 3. In this embodiment it is in the environment of a video signal raster mapper where for example compressed widescreen image information is reformatted for widescreen image reproduction. It is assumed that each horizontal line of video information consists of a sequence of compressed left side panel information, slightly expanded center panel information, and compressed right side panel information. The interpolator in this instance expands the right and left sidepanel information and compresses the center panel information to provide non-compressed/expanded lines of horizontal information for utilization by a widescreen display apparatus.

In FIG. 3 the compressed/expanded video information is applied to a data input terminal which is coupled to a data buffer 10. The data buffer 10 includes a demultiplexing switch 12, two one-horizontal line buffer memories 14 and 16 and a multiplexing switch 18. The data buffer is controlled by a control signal generator 38 to load incoming data in one buffer memory while at the same time providing data (representing a previously stored line of information) from the second buffer memory to the interpolator circuitry. The two buffer memories alternate between receiving and outputting data. The receiving memory is clocked at the rate of occurrence of incoming samples while the outputting memory is clocked at a rate determined by the interpolation function. The output clock rate may in fact be the same as the input rate but operated in start/stop fashion.

A similar data buffer 44 is coupled at the output of the interpolator to receive interpolated samples at one rate and to provide interpolated samples at an output terminal OUT at a constant rate.

The control of the entire system is provided by a counter 40 and a read only memory 42, which provide control signals to the clock generator 38, the values F(t) to the nonlinear portion of the interpolator and the values R/N to the linear portion of the interpolator. At the beginning of each horizontal line interval, the counter 40 is reset to a predetermined value (e.g., zero), by a horizontal synchronization signal HORIZ. Thereafter the counter 40 begins counting cycles of a clock signal ($4f_{sc}$) which is synchronous with the incoming data signal and has a frequency at least as high as the incoming data rate. Each count value provided by the counter corresponds to a known position on the horizontal line of video information. The count values provided by the counter 40 are coupled as address values to the ROM 42. The ROM is preprogrammed at its respective address locations to provide the appropriate control signals to the generator 38 and to provide the appropriate values corresponding to F(t) and R/N.

The actual interpolator includes: a non-linear signal path consisting of a compensation filter 22 and a multiplier 34; a linear signal path including a compensating delay element 20 and a linear interpolator 24; and a summing circuit 36 for adding the signals processed in the two signal paths. Signal from the data buffer 10 is coupled to both the linear and non-linear signal paths. In the nonlinear signal path the signal is filtered in the compensating filter 22 which is a finite impulse response filter having symmetrical tap coefficients corresponding to the values $k_n$. Output signal from the filter 22 is coupled to the multiplier 34 wherein it is multiplied by the values F(t). Scaled values from the multiplier 34, which conform to the non-linear portion of equation 16, are coupled to one input terminal of the summing circuit 36, the output of which is coupled to the data buffer 44.

In the linear signal path, the input signal is coupled to a delay element 20 which compensates for the difference in processing delays between the linear and nonlinear signal paths. The output terminal of the delay element 20 is coupled to a one sample delay element 26 and the minuend input terminal of a subtracter 28. Delayed samples from the delay element 26 are coupled to the subtrahend input terminal of the subtracter 28. Output differences from the subtracter are coupled to a multiplier 30 wherein they are multiplied by the value R/N. Respective output samples from the multiplier 30 and the delay element 26 are coupled to first and second input terminals of an adder 32. If the current sample provided by the delay element 20 is g(1) then the current sample provided by the delay element 26 is g(0).

The output signals provided by subtracter 28, multiplier 30 and adder 32 are (g(1)−g(0)); R/N(g(1)−g(0)); and R/N(g(1)−g(0))+g(0) respectively. The terms of the output signal from the adder 32 may be rearranged to R/N(g(1)+g(0) (1−R/N) which conforms to the linear response portion of equation 16. These sums are coupled to a second input terminal of the summing circuit 36.

Figure 4:
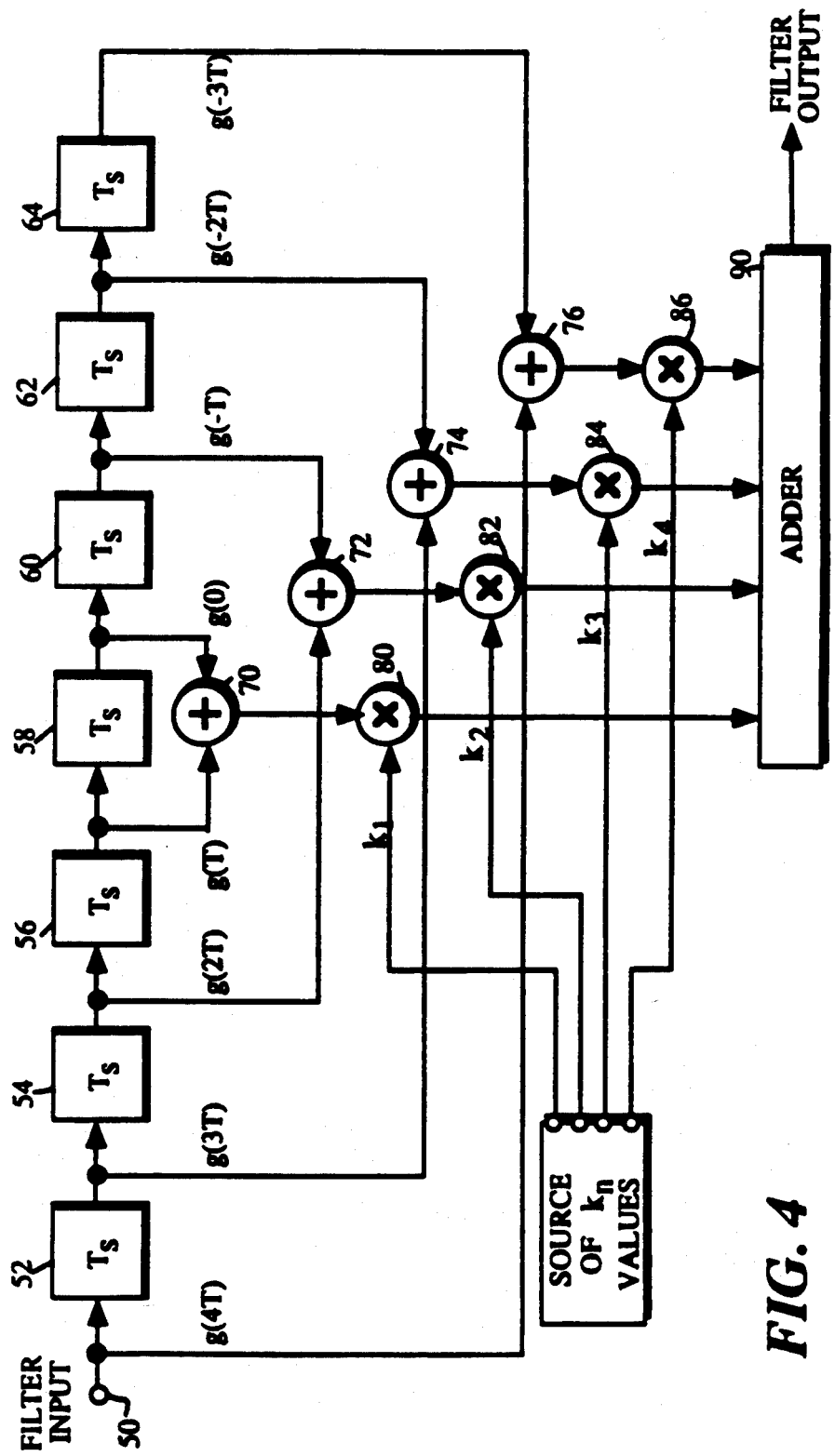
FIG. 4 is a block diagram of a compensating filter which may be implemented for the filter 22 in FIG. 3.

FIG. 4 illustrates exemplary circuitry for realizing the compensating filter 22. Since pairs of samples are weighted with like coefficients, these pairs are first combined and then weighted to reduce hardware. The particular filter shown is an eight tap filter, however a filter of more or less taps may be used.

In FIG. 4 input signal is applied to the cascade connection of seven one-sample delay elements 52–64. Input signal and delayed signal from delay element 64 are coupled to respective input terminals of an adder 76. Output sums from adder 76 are coupled to a multiplier 86 wherein they are multiplied by the coefficient $k_4$ to generate the sum of products $k_4 \cdot g(4T) + k_4 \cdot g(-3T)$ which is equal to $k_4 \cdot g(4T) + k_{-3} \cdot g(-3T)$. The sum of products provided by the multiplier 86 is coupled to an adder 90 which provides the filter output signal corresponding to the term in brackets in equation 16.

Delayed signals from delay elements 52 and 62 are coupled to respective input terminals of an adder 74, the output of which is applied to a multiplier 84. Sums of signals provided by adder 74 are multiplied by the coefficient $k_3$ in multiplier 84 to produce the sum of products $k_3 \cdot g(3T) + k_3 \cdot g(-2T)$ which is equal to $k_3 \cdot g(3T) + k_{-2} \cdot g(-2T)$. Output signals from multiplier 84 are coupled to the adder 90.

Delayed signals from delay elements 54 and 60 are similarly coupled to an adder 72 and multiplier 82 combination which provide the sums of products $k_2 \cdot g(2T) + k_{-1} \cdot g(T)$ to the adder 90. Similarly, delayed signals from delay elements 56 and 58 are applied to an adder 70, multiplier 80 combination which provide the sums of products $k_1 \cdot g(T) + k_0 \cdot g(0)$ to adder 90. Adder 90 sums the output signals provided by the multipliers 80–86 to produce the filter output signal.

It should readily be appreciated that the compensating delay element 20 in FIG. 3 may be eliminated by obtaining the signal which is applied to the linear interpolator from the appropriate delay element of the filter illustrated in FIG. 4 (e.g., signal from delay element 56).

In addition the coefficients, $k_n$, listed in Table I may be modified slightly to facilitate hardware realization of the multipliers by using the closet binary ratio to the coefficient. For example, $k_1$, $k_2$, $k_3$ and $k_4$ may be 9, 14, 8 and 6 sixty fourths respectively, or 17, 27, 17 and 12 one-twenty-eights respectively. Similarly, the values of F(t) may be adjusted to equal a binary ratio. As such the multiplier may be realized with shift-and-add circuitry.

While the invention has been described in the environment of video processing, it is to be understood that it is applicable to processing any sampled data signal.

What is claimed is:

1. A sampled data interpolator comprising:
an input terminal for receiving a sampled data input signal;
a linear interpolator coupled to said input terminal for providing linearly interpolated samples at an output terminal thereof;
a finite impulse response filter coupled to said input terminal, for providing filtered samples corresponding to a compensating signal;
weighting means, coupled to said filter, for scaling said compensating signal by a normalized sinc function to provide scaled samples at an output terminal thereof; and
means, coupled to the output terminals of said weighting means and said linear interpolator for additively combining said linearly interpolated samples and said scaled samples.

2. A sampled data interpolator comprising:
an input terminal for receiving a sampled data input signal;
a linear interpolator coupled to said input terminal for providing linearly interpolated samples at an output terminal thereof;
a finite impulse response filter coupled to said input terminal, for providing filtered samples corresponding to a compensating signal, said filter having a transfer function, H, given by $$H = \sum_{-M+1}^{M} k_n \, g(nT)$$

where n is an index; T represents a sample period; g(nT) correspond to input sample values; M is a number equal to one half the number of input samples used by the filter to form a filtered sample, and $k_n$ are given by $$k_n = \frac{\sin\left(\frac{\pi}{T}\left(\frac{T}{2} - nT\right)\right)}{\frac{\pi}{T}\left(\frac{T}{2} - nT\right)}$$

for all n except zero and one, and $$k_n = \frac{\sin\left(\frac{\pi}{T}\left(\frac{T}{2} - nT\right)\right)}{\frac{\pi}{T}\left(\frac{T}{2} - nT\right)} - 0.5$$

for n equal to zero and one;
weighting means, coupled to said filter, for scaling filtered samples and providing scaled samples at an output terminal thereof; and
means, coupled to the output terminals of said weighting means and said linear interpolator, for additively combining said scaled samples and said interpolated samples.

3. A sampled data interpolator as set forth in claim 2 wherein said weighting means scales samples by a normalized sinc function.

4. A sampled data interpolator as set forth in claim 2 wherein said normalized sinc function corresponds to $$\frac{\dfrac{\sin\left(\frac{\pi}{T}(d+T)\right)}{\frac{\pi}{T}(d+T)} + \dfrac{\sin\left(\frac{\pi}{T}(d-2T)\right)}{\frac{\pi}{T}(d-2T)}}{\dfrac{2\sin\left(\frac{\pi}{T}(d_n-2T)\right)}{\frac{\pi}{T}(d_n-2T)}}$$

where d corresponds to the position of an interpolated sample between two input samples in terms of a fraction of a sample period T, and $d_n$ corresponds to a normalizing position typically T/2.

5. A sampled data interpolator comprising:
an input terminal for receiving a sampled data input signal;
a linear interpolator coupled to said input terminal for providing linearly interpolated samples at an output terminal thereof;
a finite impulse response filter coupled to said input terminal, for providing filtered samples corresponding to a compensating signal;
weighting means, coupled to said filter, for scaling said compensating signal by a normalized sinc function to provide scaled samples at an output terminal thereof, and wherein said normalized sinc function corresponds to $$\frac{\frac{\sin\left\{\frac{\pi}{T}(d+T)\right\}}{\frac{\pi}{T}(d+T)} + \frac{\sin\left\{\frac{\pi}{T}(d-2T)\right\}}{\frac{\pi}{T}(d-2T)}}{\frac{2\sin\left\{\frac{\pi}{T}(d_n-2T)\right\}}{\frac{\pi}{T}(d_n-2T)}}$$

where d corresponds to the position of an interpolated sample between two input samples in terms of a fraction of a sample period T, and $d_n$ corresponds to a normalizing position typically T/2; and
means, coupled to the output terminals of said weighting means and said linear interpolator for additively combining said linearly interpolated samples and said scaled samples.

6. A sampled data interpolator comprising:
an input terminal for receiving a sampled data input signal;
a linear interpolator coupled to said input terminal for providing linearly interpolated samples at an output terminal thereof;
a finite impulse response filter coupled to said input terminal, for providing filtered samples corresponding to a compensating signal, said finite impulse response filter having a transfer function, H, given by $$H = \sum_{-M+1}^{M} k_n g(nT)$$

where n is an index; T represents a sample period; g(nT) correspond to input sample values; M is a number equal to one half the number of input samples used by the filter to form a filtered sample, and $k_n$ are given by $$k_n = \frac{\sin\left\{\frac{\pi}{T}\left(\frac{T}{2} - nT\right)\right\}}{\frac{\pi}{T}\left(\frac{T}{2} - nT\right)}$$

for all n except zero and one, and $$k_n = \frac{\sin\left\{\frac{\pi}{T}\left(\frac{T}{2} - nT\right)\right\}}{\frac{\pi}{T}\left(\frac{T}{2} - nT\right)} - 0.5$$

for n equal to zero and one;
weighting means, coupled to said filter, for scaling said compensating signal by a normalized sinc function to provide scaled samples at an output terminal thereof; and
means, coupled to the output terminals of said weighting means and said linear interpolator for additively combining said linearly interpolated samples and said scaled samples.

* * * * *